United States Patent [19]
Phillips et al.

[11] Patent Number: 5,240,324
[45] Date of Patent: Aug. 31, 1993

[54] CONTINUOUS FLOW SYSTEM FOR MIXING AND PROCESSING BULK INGREDIENTS

[75] Inventors: Donald G. Phillips, Ontario, Canada; Garold W. Pfeifer, Bluffton, Ind.; Michael E. Zeedyk, Fort Wayne, Ind.; Johann G. Hasslbeck, Bluffton, Ind.

[73] Assignee: Bluffton AGRI/Industrial Corp., Bluffton, Ind.

[21] Appl. No.: 893,999

[22] Filed: Jun. 5, 1992

[51] Int. Cl.$^5$ .......................................... B01F 15/02
[52] U.S. Cl. .................................... 366/132; 366/141; 366/152; 366/160; 366/186; 222/55; 222/56; 222/145; 364/479; 364/502
[58] Field of Search .................... 366/16–20, 366/29, 35, 38, 43, 50, 603, 131–134, 141, 142, 151, 152, 160, 177, 181, 179, 186, 194–196; 364/478, 479, 502, 567; 222/55, 56, 66, 64, 135, 136, 145, 413

[56] References Cited

U.S. PATENT DOCUMENTS

| | | | |
|---|---|---|---|
| 2,105,266 | 1/1938 | Rendall | 366/141 |
| 3,625,488 | 12/1971 | Farnham | 366/18 |
| 3,638,916 | 2/1972 | Ursic et al. | 366/152 X |
| 3,822,056 | 7/1974 | Hawes, Jr. et al. | 366/160 X |
| 4,089,509 | 5/1978 | Morton et al. | 366/17 X |
| 4,222,498 | 9/1980 | Brock | 222/135 X |
| 4,320,855 | 3/1982 | Ricciardi et al. | 364/479 X |
| 4,581,704 | 4/1986 | Mitsukawa | 222/55 X |
| 4,786,182 | 11/1988 | Larsen | 364/502 X |
| 5,044,819 | 9/1991 | Kilheffer et al. | 366/160 X |

Primary Examiner—Harvey C. Hornsby
Assistant Examiner—Charles Cooley
Attorney, Agent, or Firm—Dann, Dorfman, Herrell and Skillman

[57] ABSTRACT

A system for combining, mixing, and further processing ingredients to produce a specified weight of a composition in accordance with a specified recipe. The ingredients are discharged from hoppers into a central conveyor. Each hopper operates under control of a hopper controller that regulates the discharge rate and controls refilling of its associated hopper. The ingredients are mixed in the central conveyor as they are transferred to a processing device, such as a mill or roaster, and then discharged from the processing device into a network of conveyors for transfer to another location for further handling. The system operates under the control of a central controller which regulates the discharge rates of the various ingredients to optimize the feedrate to the processing device. The central controller also monitors the weight of the processed product in a production run and compares it with the specified total weight for the run in order to shut down the system when the specified total weight has been processed.

7 Claims, 5 Drawing Sheets

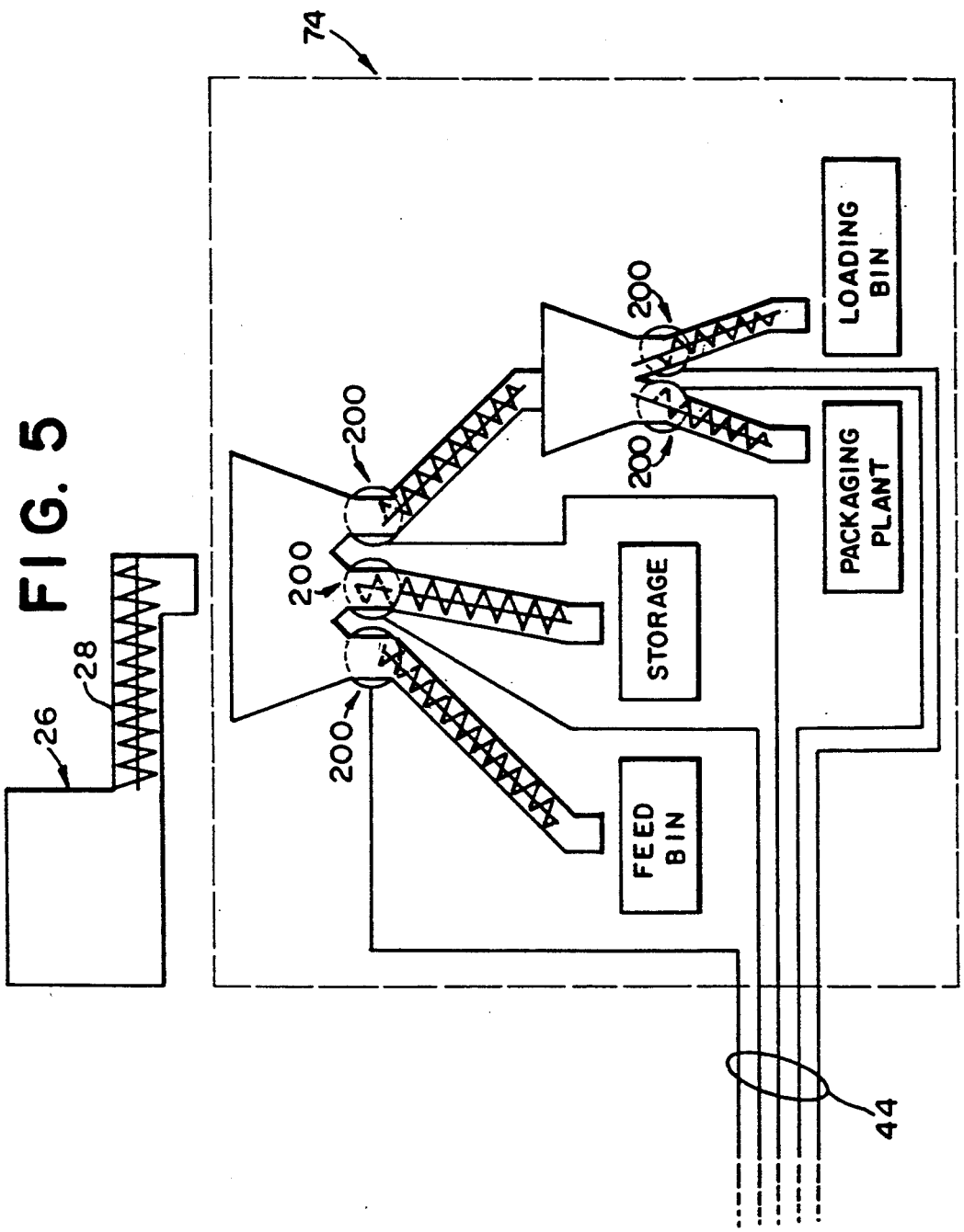

CONTINUOUS FLOW SYSTEM FOR MIXING AND PROCESSING BULK INGREDIENTS

FIELD OF THE INVENTION

This invention relates to an apparatus and method of producing a specified weight of a bulk product that is composed of a proportioned mixture of two or more ingredients. More particularly, the present invention relates to an apparatus and method for continuously combining and mixing a plurality of ingredients in accordance with a specified recipe, and then further processing the mixture in a controlled manner.

BACKGROUND OF THE INVENTION

Hitherto, known feed mixing systems have employed either volumetric or batch-weighing methods for preparing a mixture of feed ingredients. Conventional volumetric feed processing equipment measures proportioned volumes of the ingredients into a feed processor. However, an undesirable margin of error results in the mixed product when the bulk density of one or more of the ingredients varies from one batch of an ingredient to the next.

In the batch-weighing process, proportioned weights of the individual ingredients are introduced into a mixer or hopper and mixed for a specific period of time. The mixture is then made available for further processing. In addition to the inefficient, intermittent nature of the operation of such systems, ingredients that are desired to be introduced in relatively small proportions are often non-uniformly distributed throughout the resulting product.

Feed mixing systems have been developed which employ one or more computers to control the mixing process. Feed mixtures produced by the known systems are further processed after mixing. Such post-mix processing can include cleaning, roasting, and/or size reduction, as by grinding or milling. It is highly desirable to convey the feed mix to the post-mixing processor at a flow rate that provides optimum efficiency of the processor operation. However, the known feed processing systems, including those with computer-controlled mixing, leave much to be desired in optimizing the efficiency of the post-mix processing.

To further improve the efficiency of a feed mixing and processing system it would be desirable to precisely control refilling of the weighing hoppers, which are used to meter out the various ingredients, so that the mixing process is carried out continuously until a specified weight of feed mix has been processed.

To improve the versatility of a feed mixing and processing system it would further be desirable to provide the ability to create, alter, and store a variety of product recipes which can be easily retrieved for use by the feed mixing and processing system to produce a desired quantity of a selected recipe. In a feed mixing and processing plant, products made according to different recipes are usually packaged at, stored at, and/or shipped from different locations within the plant. It would be desirable to have the control of the feed mixing and processing system integrated with the control of a network of conveyors within the plant in order to deliver the product to a desired destination from the mixing and processing system.

SUMMARY OF THE INVENTION

In accordance with one aspect of the present invention there is provided a system for combining and mixing two or more ingredients to form a specified total weight of a composition in accordance with a specified recipe, and for further processing of the composition. The system according to the present invention includes two or more hoppers for holding the respective ingredients. Each hopper is equipped with a discharge device for controllably discharging the ingredient from its respective hopper and a controller for controlling the rate at which the ingredient is discharged from the respective hopper.

A central conveyor receives the ingredients from the discharge devices and conveys the combined ingredients away from the discharge devices. In a preferred embodiment the central conveyor is also constructed to mix the ingredients as they are conveyed.

A processing device, such as a mill, grinder, or roaster, receives the combined ingredients for performing a desired process on them. The processing device has an optimal operating rate, and includes a device for generating a signal that is indicative of the operating rate of the processing device.

The system according to the present invention also includes a central controller that is connected to receive the operating rate signal from the processing device. The central controller is operatively connected to the hopper discharge controllers, and, responsive to the operating rate signal, transmits discharge rate control signals to the hopper discharge controllers to control the discharge of the ingredients into the central conveyor such that the specified recipe is maintained and the combined ingredients are received by the processing device at a flow rate that allows the processing device to operate substantially at the optimal operating rate.

In accordance with another aspect of the present invention, each hopper discharge controller includes means for measuring and recording the full-weight of its associated hopper and, thereafter, periodically measuring and recording the weight of the ingredient discharged from the associated hopper. The central controller includes monitoring means for (1) determining the cumulative weight of all ingredients discharged, (2) comparing the cumulative weight of the discharged ingredients to the specified total weight, and (3) generating a system control signal for shutting down the system when the cumulative weight is substantially the same as the preselected total weight.

In accordance with further aspects of the present invention, the system includes (1) apparatus associated with the hopper discharge controllers for automatically refilling each hopper and (2) a distribution network composed of a plurality of conveyors operating under the control of the central controller for transferring the processed composition from the processing device to one or more desired locations.

BRIEF DESCRIPTION OF THE DRAWINGS

The foregoing summary, as well as the following detailed description of a preferred embodiment of the present invention, will be better understood when read in conjunction with the appended drawings, in which:

FIG. 5 is a partly schematic diagram of a distribution system for the feed mixing and processing system of FIG. 1.

DETAILED DESCRIPTION

Figure 1:
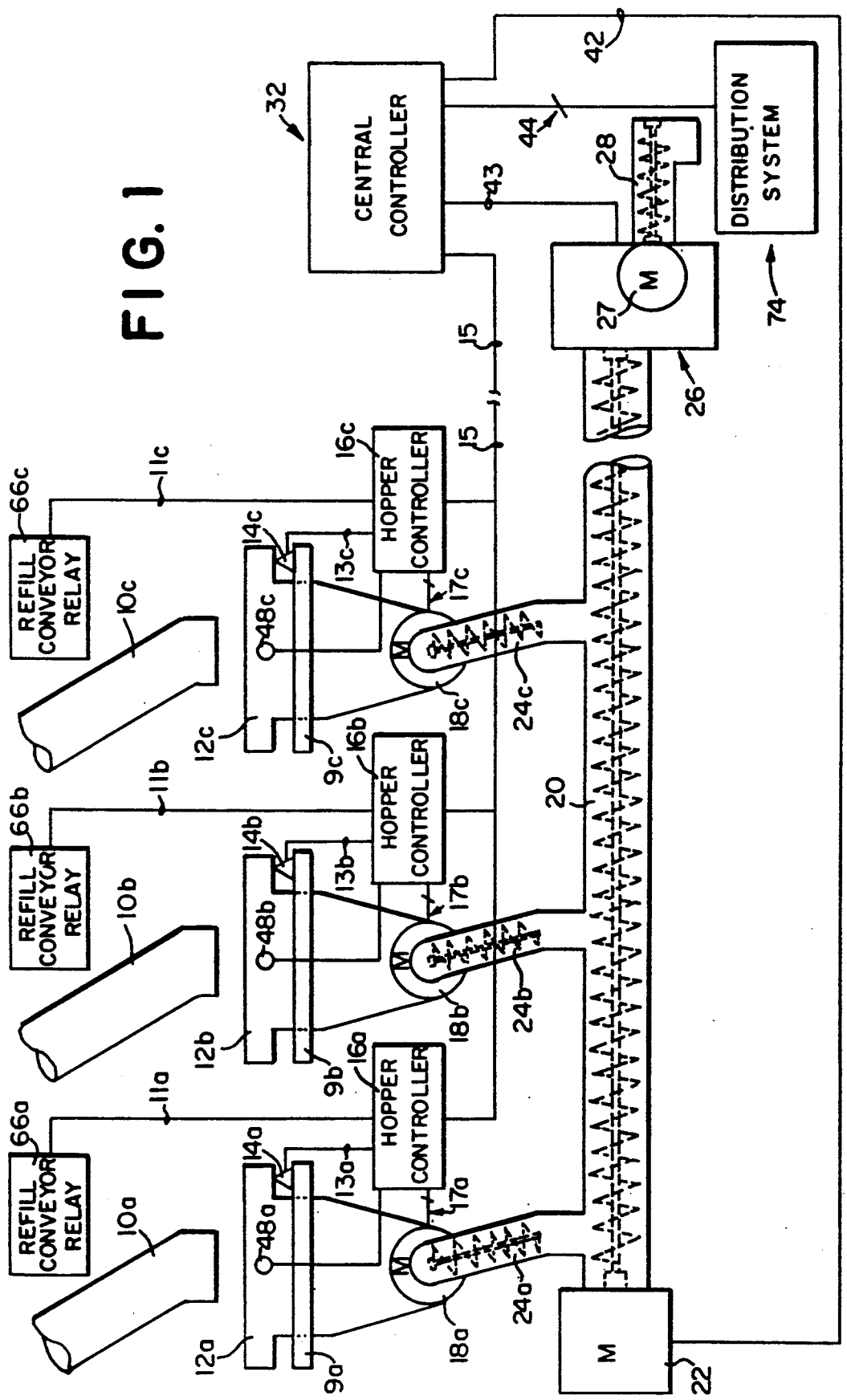
FIG. 1 is a partly schematic diagram of a feed mixing and processing system in accordance With the invention.

Referring now to the drawings, wherein like reference numerals refer to the same or similar elements across the figures, and in particular to FIG. 1, a preferred embodiment of a feed mixing and processing system in accordance with the present invention is shown. The system includes hoppers 12a, 12b, and 12c for holding bulk quantities of the individual ingredients. The hoppers 12a, 12b, and 12c are equipped with discharge devices 24a, 24b, and 24c, for example, augers, which are operated by electric motors 18a, 18b, and 18c for dispensing the ingredients from the hoppers 12a–c into a central auger 20. The central auger 20 is driven by electric motor 22 to simultaneously mix the ingredients and convey the mixed ingredients to a post-mix processor, such as a milling apparatus 26. The milling apparatus 26 which is driven by an electric motor 27 mills the mixture and discharges the milled product into a conveyor 28. Other ingredients may be added to the milled product by auxiliary hopper/dispenser units (not shown) which discharge their respective contents into conveyor 28 in a manner similar to hoppers 12a–c. Conveyor 28 discharges the milled product into a distribution system 74. As shown in FIG. 5, the distribution system 74 is an arrangement of one or more conveyors 200 that are interconnected so as to convey the milled product to a desired location within the processing plant for packaging, storage, or shipment.

Each of the hoppers 12a–c is suspended in a frame 9a–c which incorporates a strain gauge 14a–c. Each strain gauge 14a–c provides an electrical signal indicative of the weight of the hopper to the respective hopper controller 16a–c via a strain gauge signal line 13a–c. Hopper controllers 16a–c, receive the respective signals from strain gauges 14a–c respectively and compute the rate of weight loss of the hoppers 12a–c per unit time. Hopper controllers 16a–c compare the respective rates of weight loss, the discharge rates, for their associated hopper to specified discharge rates previously supplied to the hopper controllers 16a–c from a central controller 32 via a control bus 15, for example, an RS422 communication loop. Any differences between the computed and specified rates of weight loss are used by hopper controllers 16a–c to generate error signals whereby hopper controllers 16a–c adjust the speed of the respective hopper auger motors 18a–c to control the flow rate of the ingredients from the hoppers 12a–c to the central auger 20.

Conveyors 10a–c, such as augers, are located adjacent each hopper 12a–c and are arranged to supply each hopper 12a–c with its respective ingredient from a silo or other bulk storage facility (not shown). Each conveyor 10a–c is connected to a refill conveyor relay 66a–c which is actuated by a signal from the respective hopper controller 16a–c in order to effect the operation of conveyors 10a–c.

The hoppers 12a–c may be of different types for holding different types of ingredients and/or different quantities of ingredients. The overall function of each of the hoppers 12a–c and their associated components is essentially the same. Hereinafter, in describing the features and functions of hoppers 12a–c, reference will be made to hopper 12a, and its associated components, which are representative of the hoppers 12a, 12b, and 12c and their respective components.

THE CONTROL NETWORK

Figure 2:
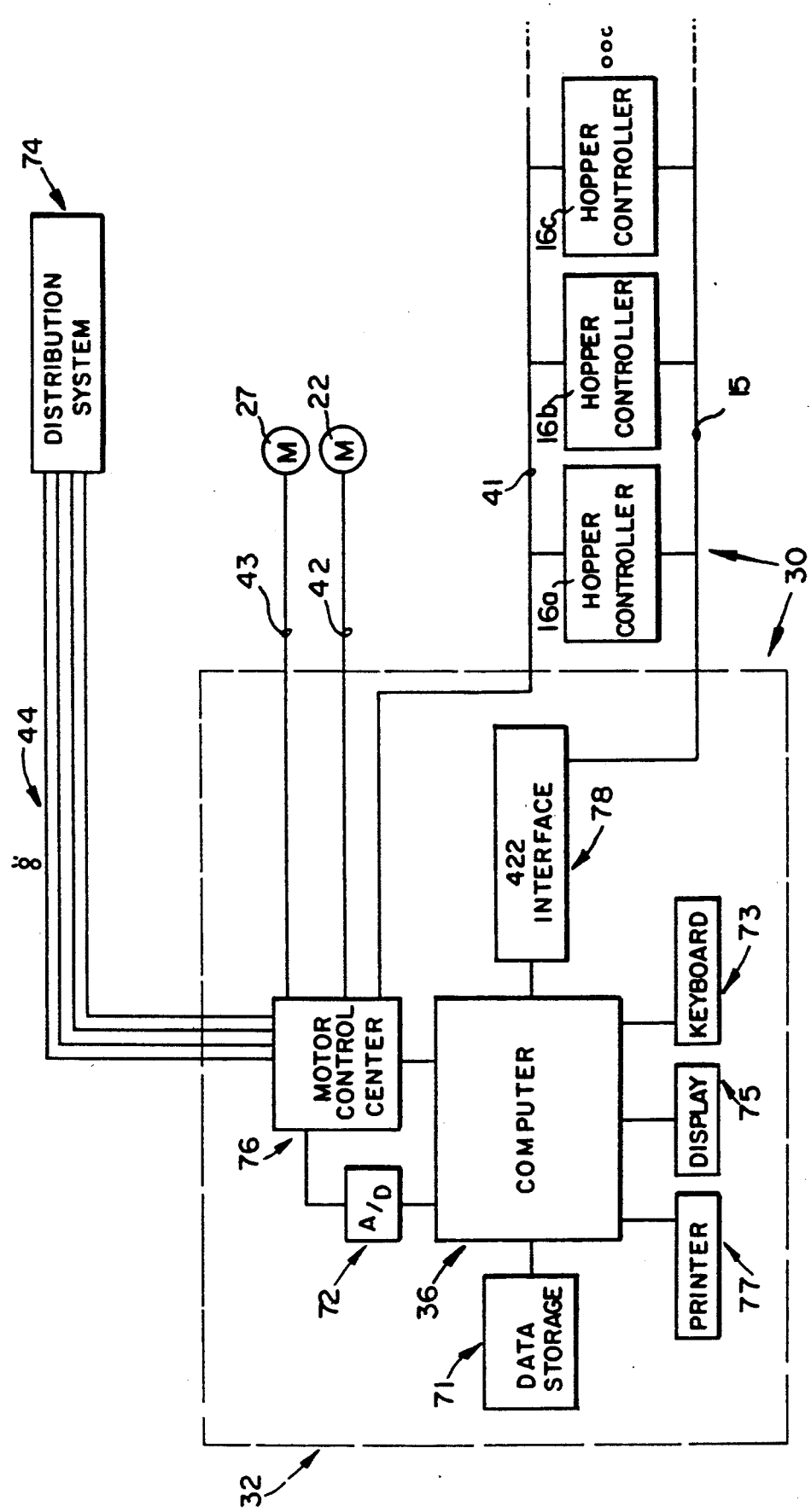
FIG. 2 is a functional block diagram of a control network for the system of FIG. 1.

Referring now to FIG. 2 there is shown a control network 30 for providing centralized control of the system in accordance with the present invention. The control network 30 includes a central controller 32; control bus 15; power lines 41, 42, and 43 for delivering electrical power to the hopper controllers 16a–c, central auger motor 22, and mill motor 27 respectively; and a power bus 44 for providing power to the conveyors 200 of the distribution system 74. The central controller 32 includes a general purpose computer 36, such as an IBM compatible microcomputer.

The central controller 32 is configured to perform the following functions: (1) coordinating the sequence in which operations of the various system components are performed, (2) optimizing the flow of ingredients to the milling apparatus 26, (3) communicating discharge rate setpoints to the hopper controllers 16a–c, (4) monitoring error signals generated by the various system components, (5) producing real-time graphic displays of various aspects of system operation, (6) maintaining production records, (7) generating production reports, (8) accepting operator commands, and (9) storing and recalling product recipes.

The central controller 32 includes an RS422 communication loop interface board 78 to permit the computer 36 to communicate with the hopper controllers 16a–c via an RS422 communication loop 15. Each of the hopper controllers 16a–c is programmed to recognize commands or data that are accompanied by a characteristic data word that is unique to each hopper controller. Additionally, all of the hopper controllers are programmed to recognize commands or data that are accompanied by a master data word that is common to all of the hopper controllers 16a–c. By using individual and master data words, the RS422 loop 15 can be used to transmit commands, such as start/stop signals, or data, such as discharge rate setpoints, to an individual hopper controller or to all of the hopper controllers simultaneously.

The central controller 32 also includes a motor control center 76. The motor control center 76 receives digital signals from the computer 36 for starting and stopping the motors that drive the central auger 20, the milling apparatus 26, and the distribution system 74. The motor control center 76 is also used to provide power to the hopper controllers 16a–c. For example, by selectively turning power on or off to one or more of the conveyors in the distribution system 74, the milled product is routed from the milling apparatus 26 to a terminal point, such as a feed bin, packaging plant, or loading bin.

An analog-to-digital converter 72 is connected to the central computer 36 for receiving an electrical signal from the motor control center 76 that is indicative of the current drawn by the mill motor 27. This electrical signal is used to monitor the electrical current being drawn by the mill motor 27. The efficiency by which the milling apparatus 26 processes the feed mix is a function of the rate at which the feed mix is supplied to the milling apparatus 26. A supply rate which is below the optimal level causes the mill motor current to drop below a desired value. Conversely, a supply rate above the optimum level causes the mill motor current to rise to a value that is above the desired value. During the operation of the system, the central computer 36 monitors the mill motor current through the analog-to-digital converter 72 and adjusts the discharge rate setpoints of the individual hopper controllers 16a–c in order to maintain an optimal flow of ingredients to the milling apparatus 26. Computer 36 adjusts the discharge rate setpoints so as to maintain the weighted proportions of ingredients required by a specified recipe.

A data storage unit 71 is connected to the central computer for storing product recipes and production reports for later retrieval. An operator input device 73, such as a keyboard, permits operator input to computer 36; and a display 75, such as a CRT monitor, provides a visual indication of system operation from computer 36. A printer 77 is also connected to computer 36 to provide hard-copies of reports of production runs, recipes, system status, etc.

THE HOPPER CONTROLLER

Figure 3:
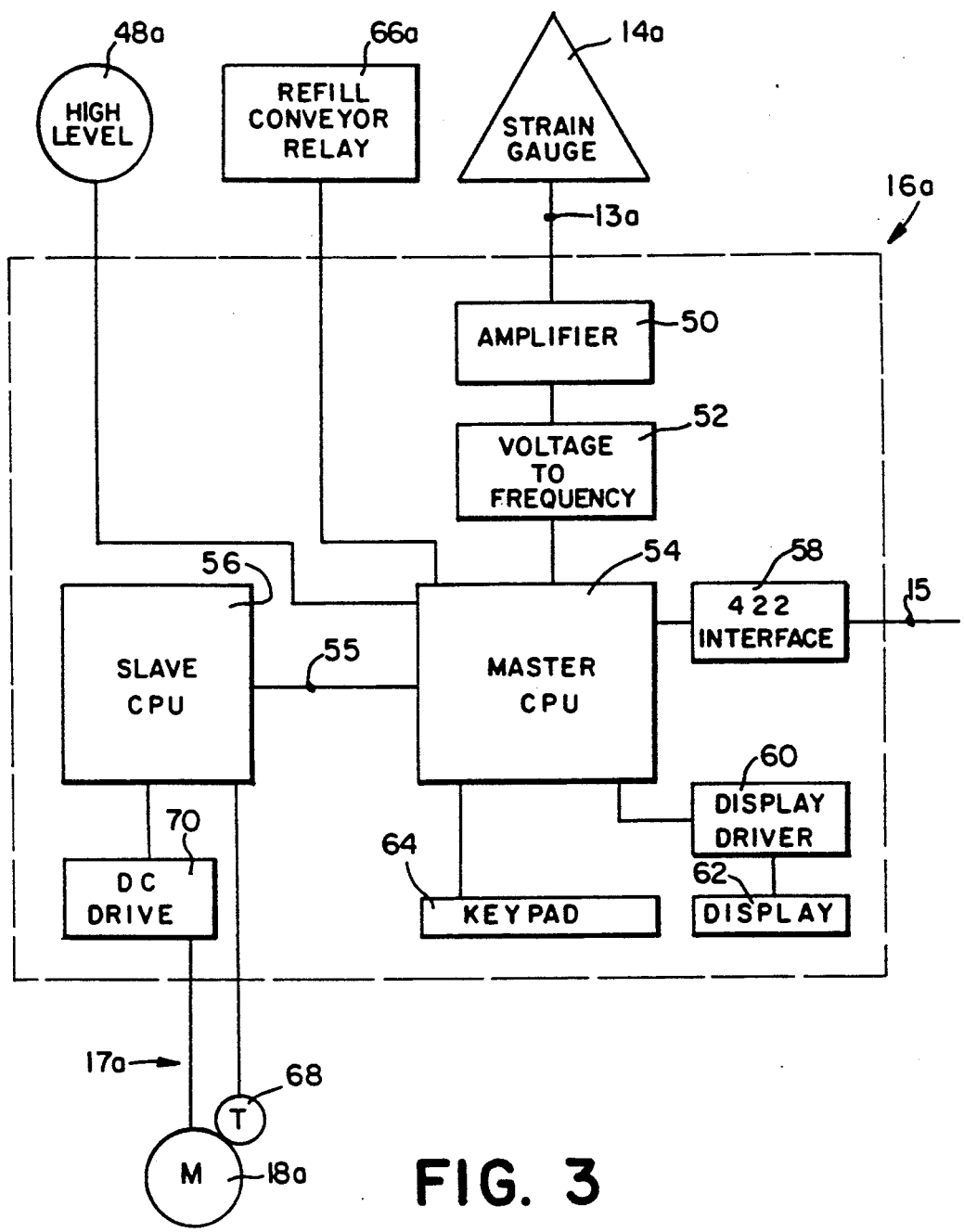
FIG. 3 is a functional block diagram of a hopper controller 16a for controlling the operation of one of the hoppers 12a shown in FIG. 1.

Hopper controller 16a, which is typical, is shown in greater detail in FIG. 3. In the embodiment shown, the hopper controller 16a includes a master central processing unit (CPU) 54 and a slave CPU 56 which are preferably microprocessor circuits, such as the Motorola 6805 series or equivalents thereof. Although the embodiment of hopper controller 16a described herein includes two CPU's, it is recognized that the functions of these two CPU's, as described below, can be integrated in and performed by a single CPU.

The master CPU 54 is programmed to perform several functions related to control of the hopper ingredient discharge rate. The functions following are among those performed by master CPU 54: (1) recording the initial full hopper weight, (2) periodically measuring the weight of the hopper 12a during system operation, (3) calculating the loss-in-weight per unit time (the discharge rate) of the hopper 12a, (4) controlling refilling of the hopper, (5) communicating discharge auger speed setpoints to the slave CPU 56, (6) communicating process data with the central computer 36, (7) accepting direct operator input via keypad 64, and (8) displaying process information via display unit 62.

The slave CPU 56 is connected to receive a discharge hopper auger speed setpoint from and transmit error conditions to the master CPU 54 via CPU bus 55. The slave CPU 56 executes a proportional, integral, and derivative (PID) control program according to the auger speed setpoint provided by master CPU 54. The slave CPU 56 determines any difference between the auger speed setpoint and the speed of the auger motor 18 as measured by a tachometer 68 and transmits auger speed control signals to an auger motor drive unit 70 to maintain the motor 18a operating at the desired speed.

The weight of the hopper 12a is measured by the master CPU 54 as follows. A strain gauge 14a in the suspension frame 9a of hopper 12a generates an electrical voltage signal that varies with the weight of hopper 12a and its contents. A linear amplifier 50, such as an LM 311 monolithic linear amplifier, is connected to receive and amplify the strain gauge signal. In another embodiment, two or more strain gauges may be used in place of strain gauge 14a to compensate for environmental conditions, such as temperature. In such embodiments several linear amplifiers 50 are used to generate a single amplified strain gauge signal. The amplified strain gauge signal is received by a voltage-to-frequency converter 52 which converts the amplified signal from a varying voltage signal to a varying frequency signal. In the preferred embodiment, the voltage-to-frequency converter 52 is realized by a type AD654 voltage-to-frequency integrated circuit. The resulting frequency signal is then supplied to the master CPU 54 which is programmed to periodically convert the frequency signal into a digital value indicative of the weight of the hopper and its contents.

The master CPU 54 also periodically calculates the discharge rate of the ingredients from the hopper 12a by calculating the difference between successive weight measurements and then dividing the calculated difference by the elapsed time between the successive weight measurements. The master CPU 54 then compares the calculated discharge rate to a discharge rate setpoint specified by the central computer 36 via the RS422 communication loop 15. The master CPU 54 is also programmed to determine if there is a difference between the calculated discharge rate and the specified discharge rate. If such a difference is found, the master CPU 54 is further programmed to transmit to the slave CPU 56 command signals for increasing or decreasing the speed of the hopper auger motor 18a as required.

The master CPU 54 controls hopper refilling as follows. A high-level indicator 48a is mounted in hopper 12a to provide an on/off signal indicating whether the hopper 12a is filled to a level that is greater than or less than a "full" level, determined by the physical location of the high-level indicator 48a within the hopper 12a. The master CPU 54 is connected to receive the on/off signal from the high-level indicator 48a for ascertaining whether the hopper 12a is full. During the start of a production run the master CPU 54 ascertains whether the hopper is full. If the hopper 12a is not full, the master CPU 54 transmits a start signal to a refill conveyor relay 66a via refill conveyor relay line 11a. The refill conveyor relay 66a then activates the refill conveyor 10a causing the hopper 12a to be filled with its ingredient. When the master CPU 54 detects that the hopper 12a is full according to high-level indicator 48a, the master CPU 54 transmits a stop signal to the refill conveyor relay 66a to stop the refill conveyor 10a. When the hopper 12a has been filled at the beginning of a production run, master CPU 54 records the "full" weight of the hopper and its contents. Using this initial value of "full" weight and the known weight of the hopper 12a, the master CPU 54 subsequently calculates desired values during the operation of the system. Such calculated values include total weight dispensed from the hopper, the weight remaining in the hopper as a percentage of the "full" weight, the estimated time until the hopper needs to be refilled, and other desired parameters.

The master CPU 54 is programmed to decide whether the hopper 12a is in need of refilling during a production run. The decision to refill is made on the basis of the initially recorded "full" weight and the most currently measured weight of the hopper In order to refill while maintaining continuous discharge of ingredients, the master CPU 54 is programmed to execute a hopper refill procedure as follows. When the hopper weight reaches a specified fraction of the initially recorded "full" weight, the master CPU 54 transmits a signal to the central computer 36 which indicates that the hopper 12a is about to be refilled. Then the master CPU 54 transmits a command signal to the slave CPU 56 to keep the hopper auger motor speed constant so as to maintain the most current discharge rate setpoint. The master CPU 54 then transmits a start signal to the refill conveyor relay 66a to start the refill conveyor 10a. While the hopper 12a is being refilled, the master CPU 54 estimates the weight of ingredient that has been discharged. The estimated weight-loss is based on the discharge rate setpoint in effect at the start of the refill procedure and the time elapsed since the refill procedure began. When the hopper 12a has been refilled to the "full" level, the high-level indicator 48a signals the master CPU 54 that the hopper is full and the master CPU 54 transmits a stop signal to the conveyor relay 66a to stop the refill conveyor 10a. The master CPU 54 then signals the central computer 36 that the refill procedure has ended, reports the weight discharged during refill, and resumes normal operation.

The hopper weight loss during refill is estimated by the master CPU 54 rather than directly measured. In order to minimize the effect of accumulated weight loss estimation errors, it is important to minimize the time spent refilling relative to the total elapsed time of the production run. Accordingly, the refill conveyor 10a is capable of providing material to the hopper 12a at a rate significantly higher, preferably as much as ten times higher, than the discharge rate of the hopper auger 24a.

The hopper controller 16a is equipped with a keypad 64 and a display 62 driven by a display driver 60 for providing interactive manual control of the hopper controller 16a. In this regard, an operator enters commands to controller 16a via keypad 64 and views the output of control parameters on the display 62. Direct operator entry of commands can be in place of or as a supplement to commands received via the RS422 communication loop 15.

SYSTEM OPERATION

Figure 4:
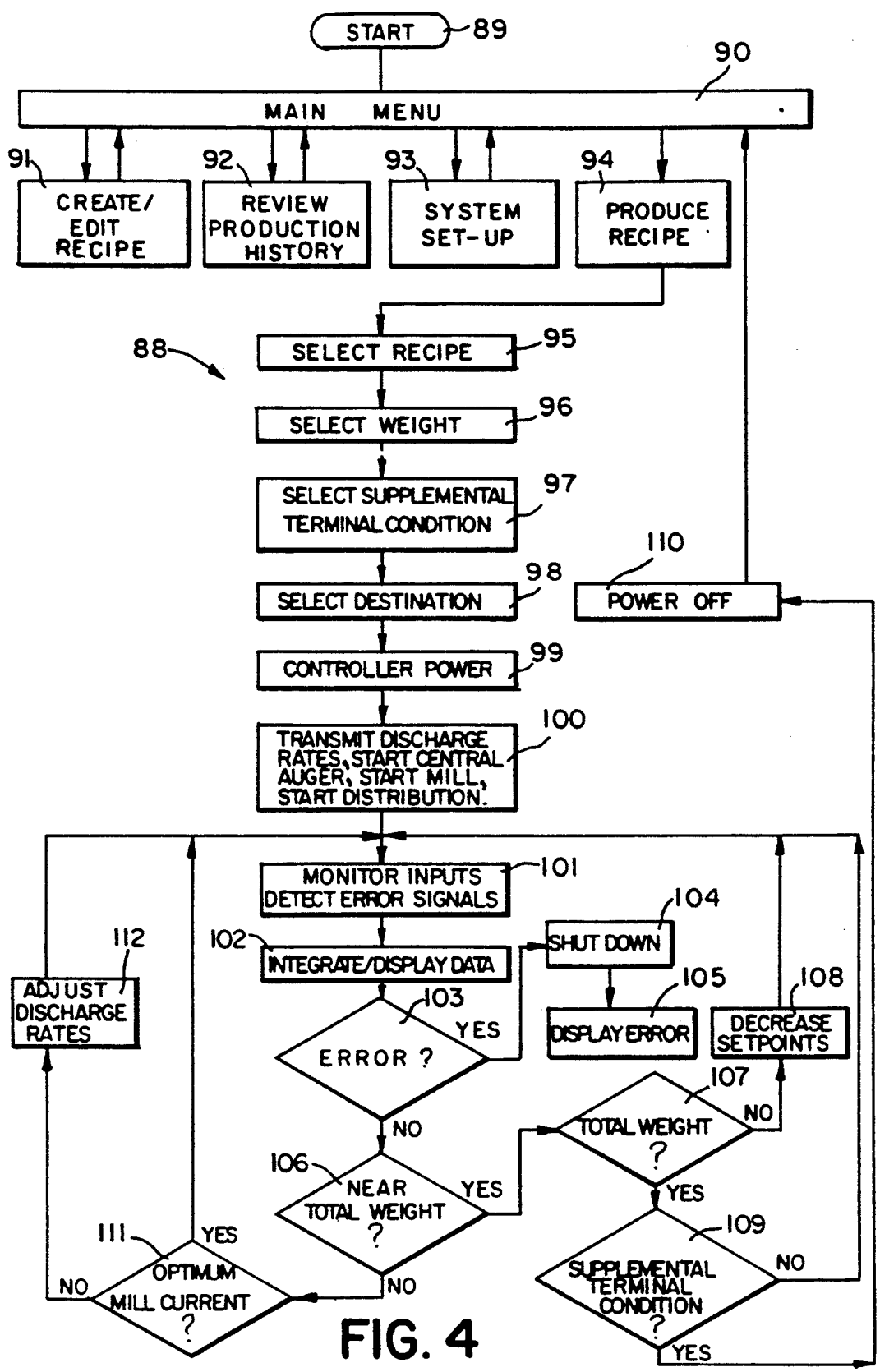
FIG. 4 is a logical flowchart of the main control procedure for operating the system of FIG. 1.

Referring now to FIG. 4, the operating process 88 of the software by which the central computer 36 effects control of system operation is illustrated. The operating process 88 includes steps and routines that enable the operator to create and edit recipes, to review production records, to inform the central computer 36 of the configuration of system components, to specify parameters for a production run of the system, to interact with a graphical representation of various aspects of system operation, and to be advised of system malfunctions.

The operating process 88 begins at start step 89 and proceeds to the main menu step 90. The computer 36 executes step 90 by displaying the main options menu on the display 75. The main menu allows the operator to select one of four routines 91-94. Routine 91 enables the operator to create or edit a recipe, routine 92 allows the operator to review and/or print production history information, routine 93 enables the operator to set up the system, and routine 94 permits the operator to produce and/or edit a recipe.

When the operator selects routine 91 to create and/or edit a recipe, the central computer 36 displays a sequence of screens on the display 75 from which the operator can select the ingredients to be used in a particular recipe and the proportions by which the selected ingredients are to be mixed. The operator enters a name for the recipe by which it is identified when stored in the mass storage unit 71. Within routine 91 the operator can also modify previously created recipes.

The operator selects routine 92 to display and/or print information about a past production run, for example, the date, time, and amount of a production run, as well as records of the ingredients used in a production run.

The operator selects routine 93 before the first use of the system or whenever the physical layout of the system is to be modified. Within the set-up routine 93, the operator specifies the equipment included in the system layout such as the number of hoppers and the number and types of processing devices, the configuration of the distribution system 74, and other parameters of the system configuration that are used by the control program to determine the proper combinations and sequences in which to apply electric power to the system components during a production run.

Once the system set-up routine 93 has been run and a recipe has been created, the operator can select routine 94 from the main menu 90 in order to make a production run. Upon selecting routine 94, the operator is requested to enter several conditions or parameters for the production run. In the embodiment shown in FIG. 4, the operator is asked in step 95 to select the recipe to be used and in step 96 the operator is prompted to enter the weight of product to be produced.

In step 97, the operator is presented with the option of specifying a supplemental terminal condition which will be used to terminate the production run in addition to or as an alternative to the total weight chosen in step 96. For example, if one of the ingredients used in a particular recipe is perishable, it may be desired to run the system beyond the total specified weight until all of the perishable ingredient is consumed.

Proceeding to step 98, the operator is asked to specify a destination in the plant to which the product will be conveyed after it is processed. The central computer 36 uses the destination specified in step 98, if any, to provide power via the motor control center 76 to the conveyor motors in the distribution system 74 that will cause delivery of the product to the specified destination.

When the operator has specified the necessary parameters in steps 95-98, the central computer 36 commences operation and control of the system. In step 99, the computer 36 signals the motor control center 76 to supply electric power to the hopper controllers 16a-c. Computer 36 transmits the initial discharge rate setpoints to the hopper controllers 16a-c via the RS422 communication loop 15. Then, in step 100, the central auger motor 22 is started, the milling apparatus 26 is started, and the distribution network conveyor motors 74 are started.

In step 101 the central computer 36 monitors the system components to effect control of system operation. In monitoring system operation, computer 36 polls the hopper controllers 16a-c at periodic intervals to determine the weight discharged from each hopper 12a-c. Computer 36 also obtains a reading of the mill motor current and records any error signals that are detected. A time delay is incorporated into each task performed by computer 36 during step 101 to allow for damping of transient values before the particular value is read by computer 36.

In step 102, computer 36 updates the information displayed on the graphic display 75 in accordance with the data obtained in step 101. The measurements of discharged weight are added to a running total of product weight produced by the system.

In decision step 103, the central computer 36 determines whether an error condition was detected during the execution of step 102. If an error condition exists, for example, failure of a hopper controller 16a, then central computer 36 turns off power to the system in step 104 and displays the error condition in step 105 so that the operator can take appropriate action. In another embodiment, the control program can be structured to receive error signals as interrupt inputs so that the system is shut down immediately upon detection of an error condition.

If no error condition exists, the control process moves from decision step 103 to decision step 106 in which the running total of the weight processed product is compared to the total weight specified in step 96. If the running total of the weight of processed product is not within a predetermined tolerance of or is not above a preselected fraction of the specified weight, the control process moves to decision step 111.

In decision step 111, the measured mill motor current is compared to a reference value that is indicative of the optimum mill motor current. If the mill motor current is within a predetermined acceptable tolerance of the reference value, the program returns to the monitoring step 101. If the mill motor current is found to be outside the acceptable limits, control passes to step 112 in which the discharge rate setpoints issued to each of the hopper controllers 16a-c are either increased or decreased so as to adjust the flow of mixed ingredients to the milling apparatus 26 toward the optimum feed rate. In step 112, all of the discharge rates are altered by the same fraction or multiplier in order to keep the relative proportions among the rates constant in accordance with the recipe being run.

If in decision step 106, it is found that the running total of weight of product produced is within a predetermined tolerance of, or above the preselected fraction of the total weight specified in step 96, control passes to decision step 107. In decision step 107, computer 36 determines whether or not the specified production weight has been reached. If the specified weight has not been reached the processing proceeds to step 108 wherein central computer 36 sends command signals to each of the controllers 16a-c to decrease the discharge rate setpoints. By iteratively executing the loop defined by steps 106, 107, and 108 as the specified total weight is approached, the system decelerates production until the specified weight is reached in order to avoid overshooting the desired weight of processed product. Optimization of product feedrate through the mill is suspended during the deceleration cycle.

When the specified weight is reached, control passes to step 109 in which a test is made to determine whether a supplemental terminal condition specified in step 97 has been satisfied. If the condition has not been satisfied, control passes to step 101 and the system continues to run until the supplemental condition has been satisfied. When that occurs, or if no supplemental condition was specified in step 97, control passes to step 110 in which the central computer 36 shuts down the various components of the system. Upon completion of the shut-down step 110, the program returns to the main menu in step 90.

From the foregoing disclosure and the accompanying drawings, it can be seen that the present invention provides certain novel and useful features that will be apparent to those skilled in the pertinent art. In particular there has been described an improved feed mixing and processing system wherein a specified quantity of a product mixed from two or more ingredients, according to a specified recipe is processed; wherein the ingredients of the product are continuously metered according to weight, continuously mixed while being delivered to a processing apparatus, continuously processed at an optimum rate of the processing apparatus, and continuously delivered to a selected destination; and wherein individual hopper controllers replenish the supply of ingredients to be metered and mixed without interrupting operation of the system.

The terms and expressions which have been employed are used as terms of description and not of limitation and there is no intention in the use of such terms and expressions of excluding any equivalents of the features shown and described, or portions thereof, but it is recognized that various modifications are possible within the scope of the invention claimed.

We claim:

1. A system for mixing and further processing a specified total weight of a composition containing at least two ingredients in accordance with a specified recipe, said system comprising:

a first hopper for holding a first ingredient;

first discharge means for discharging the first ingredient from said first hopper at a first hopper discharge rate;

a first discharge controller for controlling the rate at which the first ingredient is discharged by said first discharge means in response to a first, variable, discharge rate control signal;

a second hopper for holding the second ingredient;

second discharge means for discharging the second ingredient from said second hopper at a second hopper discharge rate;

a second discharge controller for controlling the rate at which the second ingredient is discharged by said second discharge means in response to a second, variable, discharge rate control signal;

a central conveyor for receiving the first and second ingredients from said first and second discharge means respectively, and conveying the first and second ingredients away from said first and second discharge means;

a processing apparatus for receiving the first and second ingredients from said central conveying means and further processing the first and second ingredients, said processing apparatus providing a processing rate signal; and a central controller responsive to the processing rate signal from said processing apparatus and operatively coupled to said first and second discharge controllers (a) for providing said first and second, variable, discharge rate control signals and (b) for adjusting said first and second, variable, discharge rate signals in response to said processing rate signal, whereby the first and second hopper discharge rates are adjusted during operation of the system, such that the specified recipe is maintained and the first and second ingredients are received by said processing apparatus at a flow rate that allows said processing apparatus to operate substantially at an optimal processing rate for said processing apparatus.

2. The system of claim 1 wherein:

said first discharge controller comprises first weight recording means for measuring and recording the weight of the first ingredient that is discharged by said first discharge means from said first hopper;

said second discharge controller comprises second weight recording means for measuring and recording the weight of the second ingredient that is discharged by said second discharge means from said second hopper; and said central controller comprises monitoring means for (1) periodically receiving a recorded weight from each of said first and second discharge controllers, (2) keeping a running total of the recorded weights received from said first and second discharge controllers, (3) comparing the running total weight of the discharged ingredients to the specified total weight, and (4) generating a first system control signal for shutting down the system when the running total weight is substantially the same as the specified total weight.

3. The system of claim 1 further comprising a first refill conveyor for refilling said first hopper, and wherein said first discharge controller comprises first refill control means for (1) measuring and recording a full-hopper weight of the first ingredient in said first hopper when said first hopper is full of said first ingredient, (2) periodically measuring and recording a current weight of the first ingredient in said first hopper as said first ingredient is being discharged, (3) comparing the current recorded weight of the first ingredient to the recorded full-hopper weight of the first ingredient, and (4) starting said first refill conveyor when the current recorded weight of the first ingredient in said first hopper is less than a specified fraction of the recorded full-hopper weight of the first ingredient, whereby said first hopper is refilled with said first ingredient.

4. The system of claim 1 further comprising a distribution network formed for receiving the processed composition from said processing apparatus and for transferring the processed composition to a desired location.

5. The system of claim 4 wherein said distribution network comprises a plurality of interconnected conveyors.

6. The system of claim 5 wherein said central controller comprises distribution control means for selecting and activating said conveyors so as to effect transfer of the processed composition from said processing apparatus to the desired location.

7. The system of claim 1 wherein the central conveyor comprises means for mixing the first and second ingredients.

* * * * *